Patented July 28, 1942

2,291,416

UNITED STATES PATENT OFFICE 2,291,416

RESINOUS COMPOSITION OF MATTER

William J. Sparks, Elizabeth, and Donald C. Field, Linden, N. J., assignors to Standard Oil Development Company, a corporation of Delaware No Drawing. Application December 14, 1940, Serial No. 370,132

11 Claims. (Cl. 260—93)

This invention relates to solid thermoplastic synthetic substances; relates particularly to polymeric-condensation substances; and relates especially to the simultaneous condensation and polymerization of iso-olefinic and aromatic chloro-substances.

One of the standard, well-known condensation reactions is the so-called "Friedel-Crafts synthesis" by which the respective molecules of an alkyl halide are condensed with the respective molecules of an aromatic hydrocarbon through the elimination of hydrogen halide; the reaction being catalyzed by solid aluminum chloride at room temperature to yield molecules of a new substance in which the molecular weight is the sum of the respective molecules of alkyl halide and the aromatic, minus the molecular weight of hydrogen chloride. Another newer, but relatively well-known reaction is the polymerization of iso-olefins such as isobutylene at low temperature by the application of a Friedel-Crafts type catalyst, particularly boron trifluoride, to yield a very high molecular weight polymer without the elimination of any portion of any of the reacting molecules; the resulting polymer usually being a substance of very high molecular weight ranging from 1000 to 350,000 or above. The polymers so obtained are substantially saturated hydrocarbon substances which are soluble in hydrocarbon liquids, but insoluble in most other liquids and inert with respect to most substances except the free halogens or active halogen-containing substances such as sulfur chloride at elevated temperatures.

It is now found that by the use of a very particular, special catalyst, these two reactions can be combined. According to this invention, an aromatic halide and an iso-olefin are simultaneously condensed and interpolymerized by the application of a Friedel-Crafts type active halide catalyst solution such as aluminum chloride or other halide, zirconium chloride, titanium chloride and uranium chloride in solution at low temperature to yield a resinous substance which is thermoplastic and has a substantial elasticity and flexibility.

Thus, the invention consists in the process of simultaneously condensing and polymerizing an aromatic halide substance with an olefin, and in the resulting thermoplastic resin obtained from the reaction. Other objects and details of the invention will be apparent from the following description.

In practicing the invention, mixtures of an aromatic halide such as benzyl chloride, or benzal chloride, or benzoyl chloride and similar aromatic chlorine substituted compounds including the various chlor-naphthalenes and the like with an olefin such as propylene or the normal butylenes, amylenes, hexylenes, etc., or an iso-olefin such as isobutylene or the iso-amylenes or iso-hexylenes are prepared at a low temperature ranging from —10° C. to —100° C. or lower, and the mixture is then treated with a catalyst consisting of a solution of aluminum chloride in an alkyl halide such as ethyl or methyl chloride or in carbon disulfide or other similar low freezing, non-complex-forming solvent. The mixture of aromatic halide and olefin may consist of equimolecular portions of the two substances or may contain an excess of the olefin up to 5 or 6 or more mols of the olefin per mol of the aromatic halide. The aromatic halide and olefin may be used in the simple mixture, but they are preferably diluted with a suitable low freezing diluent such as ethyl or methyl chloride or liquid propane or other substance such as liquid ethylene, liquid ethane or other similar inert diluent-refrigerant. Solid carbon dioxide may be used as the refrigerant, in which case it is advantageously present in substantial excess, preferably with a suitable diluent such as the above mentioned ethyl or methyl chloride or liquid propane or liquid butane or other similar diluent substance. The catalyst preferably is a solution of aluminum chloride as above disclosed, the concentration preferably ranging from 0.2% of aluminum chloride to 6% or 7% of aluminum chloride depending upon the temperature at which the solution is prepared, and the characteristics of the condensation-polymerization mixture. The amount of catalyst solution used may vary from 1% to 100% of the reactants, depending upon the characteristics of the substances making up the reactant mixture.

When the catalyst solution is added to the cold reactant mix, a rapid reaction occurs with the liberation of hydrogen chloride and heat which simultaneously condenses the aromatic halide and the iso-olefin with the elimination of the hydrogen chloride and polymerizes the coupled iso-olefinic substances into a very high molecular weight polymer, analogous in many respects to the polymer of the isobutylene alone.

*Example I*

A mixture of 10 parts by volume of benzyl chloride and 10 parts by volume of liquid isobutylene was prepared together with approximately 20 parts of liquid propane, the latter serving as a diluent and diluent-refrigerant. To the mixture at this temperature there was then added approximately 5 parts by volume of a solution of aluminum chloride in ethyl chloride, the solution containing approximately 2% of aluminum chloride. The reaction proceeded vigorously with the rapid evolution of hydrogen chloride and heat to produce a solid condensation-polymerization product. The solid material was separated from the excess of diluent refrigerant, catalyst and unreacted material, washed with alcohol, dissolved in benzene and reprecipitated with alcohol. The product was a clear, light yellow, slightly brittle, thermoplastic resin. A proximate analysis for hydrogen and carbon indicated that the product contained about 7.5% of isobutylene molecules condensed with the benzyl chloride and polymerized into the solid resin.

This material appeared to have a relatively very high molecular weight, and appeared to have in each molecule a considerable number of isobutylene radicals coupled and polymerized with a considerable number of the benzyl radicals, but in view of the relatively low solubility, difficulty was encountered in determining the precise molecular weight.

Example II

Similarly, a mixture of 10 parts of benzyl chloride and 90 parts of liquid isobutylene (at the boiling temperature of isobutylene under atmospheric pressure) were prepared and diluted and cooled with about 10 parts of liquid propane. To this mixture there were then added about 50 parts of a 2% solution of aluminum chloride dissolved in ethyl chloride. A vigorous reaction occurred as in Example I, with the liberation of quantities of hydrogen chloride and the liberation of considerable heat which volatilized a portion of the liquid propane. At the close of the reaction, the catalyst was quenched by the addition of substantial quantities of isopropyl alcohol. The material was then brought up to room temperature, rewashed with alcohol and treated with benzine (petroleum naphtha). It was found to be only partially soluble in the benzene. The soluble portion was filtered out and the solution evaporated to dryness. Upon the making of a proximate analysis, the material was found to contain approximately 5% of benzyl radicals with about 95% of isobutylene radicals.

The solid product obtained from the solution was soft and rubbery in character, with a color about that known in colorimetry as "eggshell white." In this instance also the viscosity of the solution indicated that the material had a high molecular weight, but a precise determination could not be made. This material obviously is an interpolymer-condensate of the phenyl substance and the isobutylene substance, and the rubbery character of the soluble portion suggests the preponderance of isobutylene in the polymer, since pure isobutylene polymer also is markedly rubbery in character.

The insoluble portion was too resistant to treatment to indicate its character, but it appeared to be a polymer containing a much higher proportion of the phenyl radicals.

Example III

A mixture was prepared consisting of 30 volumes of benzyl chloride with 50 volumes of liquid isobutylene (at the boiling temperature of isobutylene under atmospheric pressure). To this mixture there were then added 100 volumes of liquefied propane as an internal refrigerant and diluent. To this mixture there were then added 25 volumes of a catalyst solution made up of methyl chloride containing 1% of aluminum chloride in solution, together with a further 25 volumes of liquid propane as refrigerant-diluent for the catalyst. As in the previous examples, a vigorous reaction occurred with the evolution of quantities of hydrogen chloride and considerable heat. The catalyst was then quenched by the addition of approximately 25 volumes of isopropyl alcohol; and the reaction mixture brought up to room temperature with the volatilization of residual propane and isobutylene. The solid polymer was then removed from the residual reactants, and rewashed with alcohol. The resulting polymer was a yellow, transparent, thermoplastic solid which was found to be soluble in benzol and soluble in carbon tetrachloride, but was precipitated from such solutions by the addition of petroleum ether, the precipitate forming as a white cloud in the solution which required several days to settle to the bottom of the container. As in the previous examples, the material obviously was a high molecular weight polymer, but the exact molecular weight was not determined.

The substances of the above experiments are shown to be copolymers or interpolymers of isobutylene with the benzyl radical by the fact that while the simple isobutylene polymers are readily soluble in benzol, carbon tetrachloride, petroleum ether and other of the pure hydrocarbons, and benzyl chloride polymers are soluble in benzol and carbon tetrachloride, they are not soluble in petroleum ether; whereas the copolymer of the above examples was soluble in benzol and carbon tetrachloride, but not soluble in petroleum ether or the other light hydrocarbon solvents; and it was not possible to extract from the polymer any petroleum ether soluble substance which could have been the simple isobutylene polymer; yet the proximate analysis and the recovery of only small portions of isobutylene from the reaction mixture clearly show that the isobutylene participated in the reaction.

These reactions, as above pointed out, are not limited to benzyl chloride, but various of the other aromatic or arylkyl halides may be used, the benzyl, benzal and benzoyl compounds and their homologs, and also the various xylenic chloro compounds.

In addition to the simple olefins and iso-olefins above mentioned, the di-olefins react similarly. For this reaction, similar mixtures of the aromatic halide compounds may be prepared with the di-olefins such as butadiene, isoprene, pentadiene, the various hexadienes including dimethylbutadiene, the various heptadienes, and their homologs.

All of these and analogous resinous substances are particularly advantageous and desirable for such uses as molding compositions, surface coatings, can liners, container liners, for the preparation of proofed fabric such as cloth, paper and Cellophane; for the treatment of leather and pressed insulation board, as an adhesive for preparing laminated materials and for sealing compounds generally. The substances are compatible with and may be compounded with polyisobutylene substances (Vistanex polybutene) with chlorinated polyisobutylene, with the hard resins such as phenol and formaldehyde plastics of the type of Bakelite; with polyisoprene, with rubber, with the ethylene chloride sodium sulfide plastic known as "Thiokol," with gelatinous substances, with waxes, etc.

The reaction as above disclosed is a general one applicable to olefinic substances which contain removable hydrogen together with substances which contain removable chlorine to permit of the simultaneous production of a Friedel-Crafts condensation reaction and a polymerization reaction. The reaction, however, appears to be dependent upon the use of the particularly powerful catalyst consisting of aluminum chloride dissolved in a low freezing solvent, and in some instances the concentration of the aluminum chloride in the solvent and the ratio of catalyst solution to reactants are found both to be critical, although the critical points vary with the reactants, depending upon the ease with which the reaction occurs.

Thus, the invention consists in the simultaneous condensation and polymerization of a mixture of an olefin and an aromatic halide by the application thereto of a powerful Friedel-Crafts type catalyst in solution in a low freezing solvent at a temperature below about −10° C. to produce an interpolymer or copolymer of the olefin and aromatic radical which is a thermoplastic flexible resin.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. The process comprising in combination the steps of mixing an aralkyl halide and an olefin at a temperature below −10° C. and simultaneously condensing and polymerizing the substances by the application thereto of a dissolved Friedel-Crafts type catalyst.

2. The process comprising in combination the steps of mixing an aralkyl halide and an olefin at a temperature below −10° C. and simultaneously condensing and polymerizing the substances by the application thereto of a solution comprising aluminum chloride dissolved in a low freezing solvent having a freezing point below about −10° C.

3. The process comprising in combination the steps of mixing an aralkyl halide and an iso-olefin, cooling the mixture to a temperature below −10° C. by the admixture of a diluent refrigerant, and polymerizing the mixture by the application thereto of a dissolved Friedel-Crafts type catalyst.

4. The process comprising in combination the steps of mixing an aromatic substituted alkyl halide and an iso-olefin, cooling the mixture to a temperature below −10° C. by the admixture of a diluent refrigerant, comprising a liquid hydrocarbon and polymerizing the mixture by the application thereof of a dissolved Friedel-Crafts type catalyst.

5. The process comprising in combination the steps of mixing an aralkyl halide and an iso-olefin, cooling the mixture to a temperature below −10° C. by the admixture of a diluent refrigerant and polymerizing the mixture by the application thereto of a dissolved Friedel-Crafts type catalyst comprising aluminum chloride dissolved in a low freezing alkyl halide.

6. The process comprising in combination the steps of mixing an aralkyl halide comprising an aralkyl chloride and an iso-olefin, cooling the mixture to a temperature below −10° C. by the admixture of a diluent refrigerant, and polymerizing the mixture by the application thereto of a dissolved Friedel-Crafts type catalyst.

7. The process comprising in combination the steps of mixing an aralkyl halide and an iso-olefin comprising isobutylene, cooling the mixture to a temperature below −10° C. by the admixture of a diluent refrigerant, and polymerizing the mixture by the application thereto of a dissolved Friedel-Crafts type catalyst.

8. The process comprising in combination the steps of mixing an aralkyl halide and an olefin comprising a di-olefin at a temperature below −10° C. and simultaneously condensing and polymerizing the substances by the application thereto of a solution comprising aluminum chloride dissolved in a low freezing solvent.

9. The process comprising in combination the steps of mixing an aralkyl halide and an olefin comprising butadiene at a temperature below −10° C. and simultaneously condensing and polymerizing the substances by the application thereto of a solution comprising aluminum chloride dissolved in a low freezing solvent.

10. The process comprising in combination the steps of mixing an aralkyl halide comprising benzoyl chloride and an olefin comprising butadiene at a temperature below −10° C. and simultaneously condensing and polymerizing the substances by the application thereto of a solution comprising aluminum chloride dissolved in a low freezing solvent.

11. The process comprising in combination the steps of mixing an aralkyl halide comprising benzoyl chloride and an iso-olefin comprising isobutylene, cooling the mixture to a temperature below −10° C. by the admixture of a diluent refrigerant, and polymerizing the mixture by the application thereto of a dissolved Friedel-Crafts type catalyst.

WILLIAM J. SPARKS.
DONALD C. FIELD.